United States Patent [19]

Yoshino

[11] Patent Number: 4,626,936
[45] Date of Patent: Dec. 2, 1986

[54] RELATIVE VELOCITY CONTROL DEVICE FOR MAGNETIC RECORDING AND REPRODUCING APPARATUS

[75] Inventor: Kazuo Yoshino, Tokyo, Japan

[73] Assignee: Sansui Electric Co., Ltd., Tokyo, Japan

[21] Appl. No.: 728,372

[22] Filed: Apr. 29, 1985

[30] Foreign Application Priority Data

Apr. 30, 1984 [JP] Japan .................................. 59-87366
Sep. 5, 1984 [JP] Japan ............................... 59-184376

[51] Int. Cl.$^4$ ............................................. G11B 5/52
[52] U.S. Cl. ................................................. 360/70
[58] Field of Search ........................................ 360/70

[56] References Cited

U.S. PATENT DOCUMENTS

| | | | |
|---|---|---|---|
| 4,021,857 | 5/1977 | Tanimura | 360/84 |
| 4,282,552 | 8/1981 | Tachi et al. | 360/70 |
| 4,322,755 | 3/1982 | Kosaila | 360/70 |
| 4,484,235 | 11/1984 | Yokobori et al. | 360/70 |
| 4,584,618 | 4/1986 | Tassery | 360/70 |

*Primary Examiner*—George G. Stellar
*Attorney, Agent, or Firm*—Sughrue, Mion, Zinn, Macpeak and Seas

[57] ABSTRACT

The present invention discloses a relative velocity control device which enables to generate constant relative velocity between a head and a tape in a magnetic recording and reproducing system with a rotating head. When the tape running speed and direction are given at input terminals, the number of drum rotations is calculated by the first calculation means based on the conditional equation which makes the relative velocity constant, and the drum motor can then be rotated according to the control of the drum rotating controller which generates an output voltage corresponding to the difference between the drum rotation number calculated from the first calculation result and the present number of drum rotations detected by the drum frequency generator. The second calculation means calculates the tape running speed from the present number of drum rotations, and its output signal is given to the tape running controller which generates an output voltage corresponding to the difference between the tape running speed calculated by the second calculation means and the present tape running speed. The present tape running speed is detected through the reproducing and counting circuits by counting the number of tape tracks over which two heads on the rotating drum cross when the tape is running at high speed. In the case where the tape contains a control track for tracking control, the present tape running speed can be detected easily by the reproduced signal from this control track. According to the present invention, a program address on each record on a tape can easily be detected even from a tape which runs at high speed because the relative velocity is constant irrespective of the tape speed, thereby enabling the head on the drum to constantly trace on the program address stored in the track of the tape.

7 Claims, 15 Drawing Figures

RELATIVE VELOCITY CONTROL DEVICE FOR MAGNETIC RECORDING AND REPRODUCING APPARATUS

BACKGROUND OF THE INVENTION

1. Field of the Invention

The present invention relates to a relative velocity control device for use with a magnetic recording and reproducing apparatus of the rotating head type, wherein head rotating and tape running speeds are controlled to keep the relative velocity between head and tape constant at the time when the tape is running at high speed.

2. Technical Background of the Invention

The recording density of the tape which is used in the magnetic recording and reproducing apparatus of the rotating head type has, in recent times, been enhanced and a plurality of programs are often recorded on the same tape. It is thus needed to search and tetrieve the programs. In the case of the rotating head type VTR, the manner in which an exclusive track is provided on the tape to retrieve the recorded programs and recording address signals on the track in order to retrieve and edit the programs has been widely employed by businesses. In the case of the home VTR, however, the tape is narrow and it is therefore not desirable from the viewpoint of the use efficiency of the tape that the track exclusively used to retrieve the programs is provided on the tape. In addition, a fixed head for the track must be added, thereby making the cost high. Therefore, the address signals are recorded on the video track together with main signals. In this case, the address signal which has been digitized is recorded at a predetermined position on every video track.

In the case of reproducing digital signals which have been recorded at high density, the rising and falling of reproduced waveform are generally inclined and its peak position is shifted because of intersymbol interference. Therefore, a bit clock is generated by the PLL circuit after waveform equalization and the digital signal is reproduced and demodulated by this bit clock. In this case, when the relative velocity between the tape and the head (which will be hereinafter referred to as the relative velocity) is changed, the frequency characteristic of the waveform equalizer circuit and capture and lock ranges of the PLL circuit must be changed according to the change of the relative velocity. The relative velocity therefore needs to be substantially constant. For the purpose of retrieving the programs at high speed, it is necessary that the address signals recorded on the tape are read while the tape is being run at a speed higher than that at the recording time. When the tape is run at a higher speed than that at the recording time, however, the relative velocity becomes different from that at the recording time and the address signals cannot be read stably, provided that the number of drum rotation and the angle of the drum inclined relative to the tape is constant. For the purpose of reading the address signals, therefore, the relative velocity also needs to be constant. Program retrieving is carried out, running the tape at high speed in a forward or reverse direction; the ratio of the relative velocities in the forward and reverse directions increases several times.

When no track exclusively used to retrieve the programs is provided, there is also no exclusive track for the speed detection which is needed to make the tape running speed constant. When a track exclusively used to retrieve the programs is provided, the fixed head for the track is added. Therefore, a signal which represents the tape running speed can be obtained from this head and the tape running speed can be kept by this signal. When no track exclusively used to retrieve the programs is provided, however, the speed detection must be carried out by another added means.

SUMMARY OF THE INVENTION

An object of the present invention is to provide a relative velocity control device capable of controlling head and tape speeds to keep the relative velocity constant in a simple manner in the case where a tape which has no track exclusively used for address signals and the like is run at high speed at the reproducing time in a magnetic recording and reproducing apparatus of the rotating head tape, which uses a tape with or a without a control track.

Another object of the present invention is to provide a relative velocity control device for use in the magnetic recording and reproducing apparatus wherein, in the case where a tape is run at a high speed, (n) times its standard speed, at the reproducing time, the number Nn of drum motor rotation with which the relative velocity becomes constant; similarly in the case where it is run at the standard speed, in response to signals which set tape running speed and direction is calculated from the following equation, $$Nn = A \cdot n + B$$

(wherein A and B represent constants) and a voltage which is proportional to the result calculated is used as reference voltage to control the drum motor; the actual number N'n of drum motor rotation is then detected and the following equation is operated, using this N'n, to get Mn (or the number of tracks which the head crosses while it traces one time) which is to be obtained when the tape is at a running speed necessary to make the relative velocity constant, $$Mn = -C/N'n + D$$

(wherein C and D represent constants);

and a voltage which is proportional to this Mn is used as reference voltage and compared to a voltage which is proportional to the number of tracks which the head crosses when the tape is actually running, and the tape is run at a constant speed according to the result obtained from this voltage comparison to thereby make the relative velocity constant.

A further object of the present invention is to provide a relative velocity control device for use with the magnetic recording and reproducing apparatus wherein, in the case where a tape is run at a high speed, (n) times its standard speed, at the reproducing time, the number Nn of drum motor rotation with which the relative velocity becomes constant, similarly in the case where it is run at the standard speed, in response to signals n which set tape running speed and signals ± which set tape running direction are calculated from the following equation, $$Nn = A \cdot n + B$$

(wherein A and B represent constants) and a voltage which is proportional to the result calculated is used as reference voltage to control the number of drum motor rotations; the actual number N'n of drum motor rotation is then detected and, using this rotation number N'n, a tape running speed n necessary to make the relative velocity constant is calculated from the following equation, $$n = (N'n - B)/A;$$

and a voltage which is proportional to the result calculated is used as reference voltage and compared with a voltage which is proportional to the frequency of a control signal, and the tape is run according to the result obtained from this voltage comparison to thereby make the relative velocity constant.

DETAILED DESCRIPTION OF THE PREFERRED EMBODIMENTS

Figure 2:
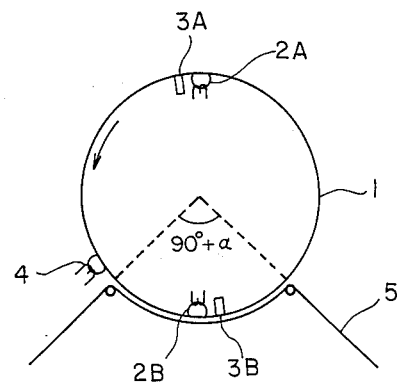
FIG. 2 shows expanded plan view of a rotating drum section which is used to explain the embodiment.
Figure 3:
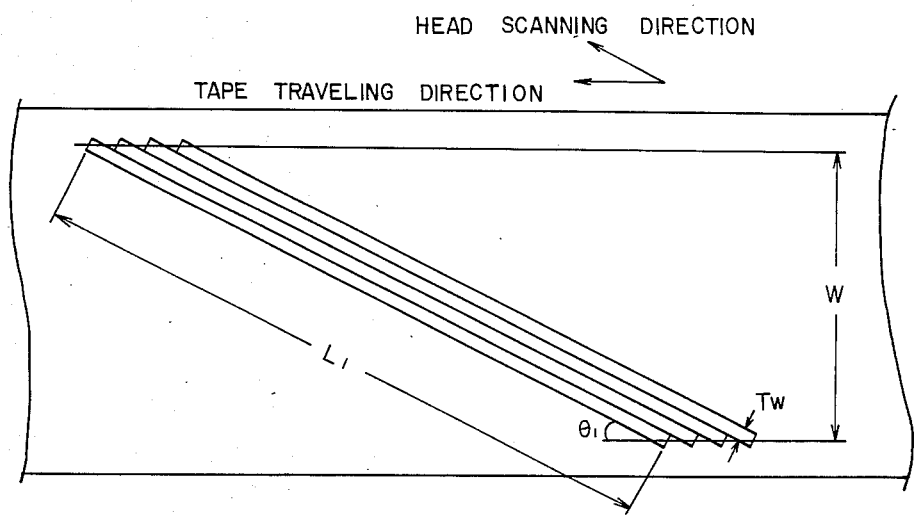
FIG. 3 is a view showing recording tracks and is used to explain the embodiment.

A case where the present invention is applied to the magnetic recording and reproducing apparatus of the rotating head type will be described. FIG. 2 shows a rotating drum section which is employed by the magnetic recording and reproducing apparatus, wherein reference numeral 1 represents a rotating drum, 2A and 2B heads arranged on the rotating drum 1 with an angle of 180° interposed between them, with azimuth angles are different from each other, and 3A and 3B magnets which have polarities different from each other and arranged on the drum 1 with an angle of 180° interposed between them. Numeral 4 denotes a drum PU head (or drum pickup head) for outputting positive and negative drum pulses alternately every half rotation of the drum 1 when the magnet 3A or 3B approaches. Numeral 5 represents a tape wound round the drum 1, covering an angle range which is a little larger than 90°. Therefore, main signals which are to be recorded during one rotation of the drum 1 are recorded on two tracks in a form in which they are compressed along a time axis. As described above, tracks each having a length $L_1$, width $T_w$ and inclination $\theta_1$ are recorded side by side in the width direction of the track on that tape area of effective width W which corresponds to the drum 1 rotated by 90°, as shown in FIG. 3.

Figure 1:
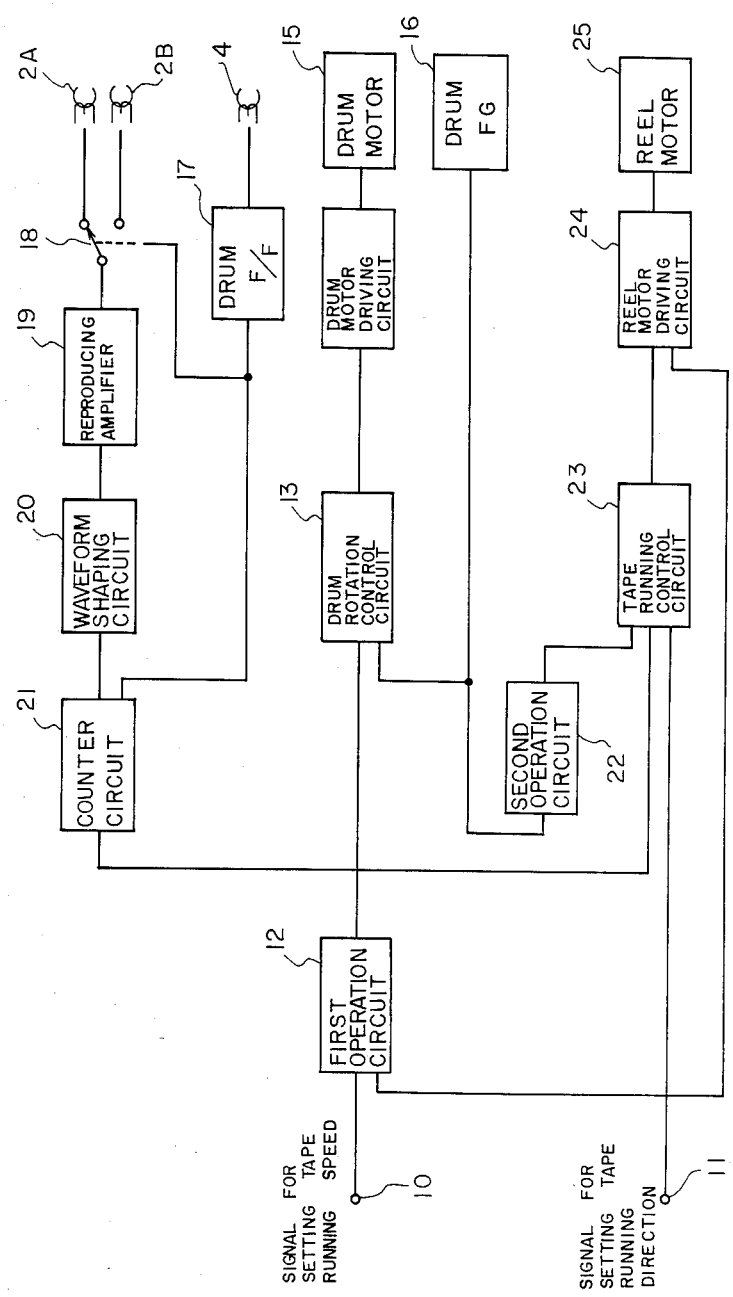
FIG. 1 (shows a block diagram of an embodiment of the present invention.

FIG. 1 is a block diagram showing an example of the control device according to the present invention. In FIG. 1, numeral 10 denotes an input terminal to which a signal for setting the tape running speed is applied, 11 an input terminal to which a signal for setting the tape running direction is applied, 12 a first operation circuit for performing a predetermined operation on the basis of the signals, which set the tape running speed and direction, to determine the number of drum rotations and generating a reference voltage which corresponds to the number of drum rotations, 13 a drum rotation control circuit, 14 a drum motor driving circuit, 15 a drum motor, 16 a drum FG (or drum frequency generator) for detecting the number of drum rotations, 17 a drum FF (or drum flip-flop) set and reset by the drum pulses, 18 a switch changed over by an output of the drum FF 17 to selectively flow the reproduced output of the head 2A or 2B, 19 a reproducing amplifier, 20 a circuit for waveform shaping the output of the reproducing amplifier 19, 21 a counter circuit for counting output pulses of the waveform shaping circuit 20 while using the output period of the drum FF 17 as a unit, and outputting a voltage which corresponds to a value counted, 22 a second operation circuit for performing a predetermined operation on the basis of the output of the drum FG 16 or number of drum motor rotations to determine the tape running speed and generating a reference voltage for this tape running speed, 23 a tape running control circuit, 24 a reel motor driving circuit, and 25 a reel motor.

When the tape running speed and direction are optionally set and the signals which have set the tape running speed and direction like this are applied to the input terminals 10 and 11, respectively, the drum motor 15 rotates, making the head have a constant relative velocity in relation to the tape running speed and direction setting signals (this constant relative velocity represents the one at the recording time). On the other hand, tape running is done, using, as its reference voltage, a voltage which is based on the actual number of drum motor rotations detected. Detailed description will be given below, referring to FIG. 1.

The tape running speed and direction setting signals are applied to the input terminals 10 and 11, respectively. When the tape is run at a speed (n) times its running speed at the recording time (which will hereinafter be referred to as standard speed), the tape running speed setting signal is a signal which corresponds to the absolute value of (n), and the tape running direction setting signal a signal which corresponds to the polarity of (n). These setting signals are inputted to the first operation circuit 12 where the rotation number of the drum motor 15 is calculated using the following equation, and a voltage which is proportional to this rotation number is generated as reference voltage:

$$Nn = A \cdot n + B \tag{1}$$

(wherein Nn represents the rotation number of the drum motor, n which is affixed to N denotes that the tape is at an (n) times speed, and A and B represent constants). Differential voltage between a voltage proportional to the output of the drum FG 16 and the reference voltage causes the drum motor 15 to be rotated through the drum rotation control and drum motor driving circuits 13 and 14. Since the drum motor 15 is set to rotate in the same direction even when the tape is run in forward or reverse direction, the rotation number Nn of the drum motor 15 increases, provided that the running direction of the tape is the same as at the recording time and that the polarity of (n) be positive, while it is reduced, provided that the running direction of the tape be reverse to that at the recoring time and that the polarity of (n) be negative.

The drum FG 16 detects the rotation number of the drum motor 15 and generates a signal which has a frequency proportional to the rotation number. The standard (or reference) voltage which is the output of the first operation circuit 12, and output of the drum FG 16 are inputted into the drum rotation control circuit 13 and after the output of the drum FG 16 is subjected to frequency/voltage conversion, it is compared with the reference voltage and its differential voltage is outputted and added to the drum motor driving circuit 14, thereby enabling the drum motor 15 to stably rotate at a rotation number N'n. The output of the drum FG 16, that is, actual rotation number N'n of the drum motor 15 is inputted into the second operation circuit 22 where the number Mn of tracks which one head crosses when it traces the tape one time is calculated, using the following equation:

$$Mn = -C(1/N'n) + D \quad (2)$$

wherein C and D represent constants.

Figure 4:
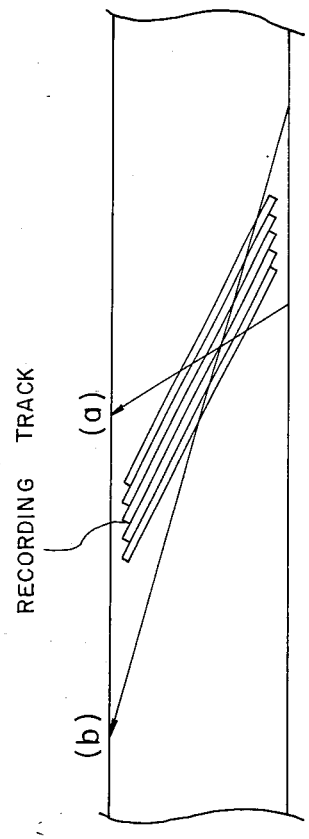
FIG. 4 is a view showing the traces of a head and is used to explain the embodiment.

When the tape is at the reference speed, the head does not cross the other tracks since it traces the same track. FIG. 4 shows those loci which the head traces when the tape runs at high speed in forward and reverse directions. (a) represents a case where the tape runs at high speed in forward direction, while (b) another case where the tape runs at high speed in reverse direction, and where the head crosses plural tracks in both cases. As is apparent from this, it is believed that the tape runs at a constant speed when the number of tracks which the head crosses while it traces the tape one time is kept constant.

The equations (1) and (2) will be described later in detail. However, when the drum motor 15 rotates at the rotation number Nn in the equation (1) and the number Mn of tracks which the head crosses is related to the actual rotation number N'n of the drum motor 15 by the equation (2), the relative velocity between the head and the tape is equal to the one when the tape is at the reference speed. It is questioned in this case that Nn=N'n, but since the drum motor 15 is controlled, using Nn in the equation (1) as its reference signal, error between Nn and N'n is extremely small and negligible.

Responding to the actual rotation number of the drum motor 15, the second operation circuit 22 calculates the equation (2) to obtain the number Mn of tracks and further generates a reference voltage which is proportional to this number of tracks. The polarity of this voltage is positive when the tape running direction is forward. That is, rotation of the drum motor 15 is faster than at the recording time, but it is negative when the tape running direction is reverse. In other words, rotation of the drum motor 15 is slower than at the recording time.

Figure 5:
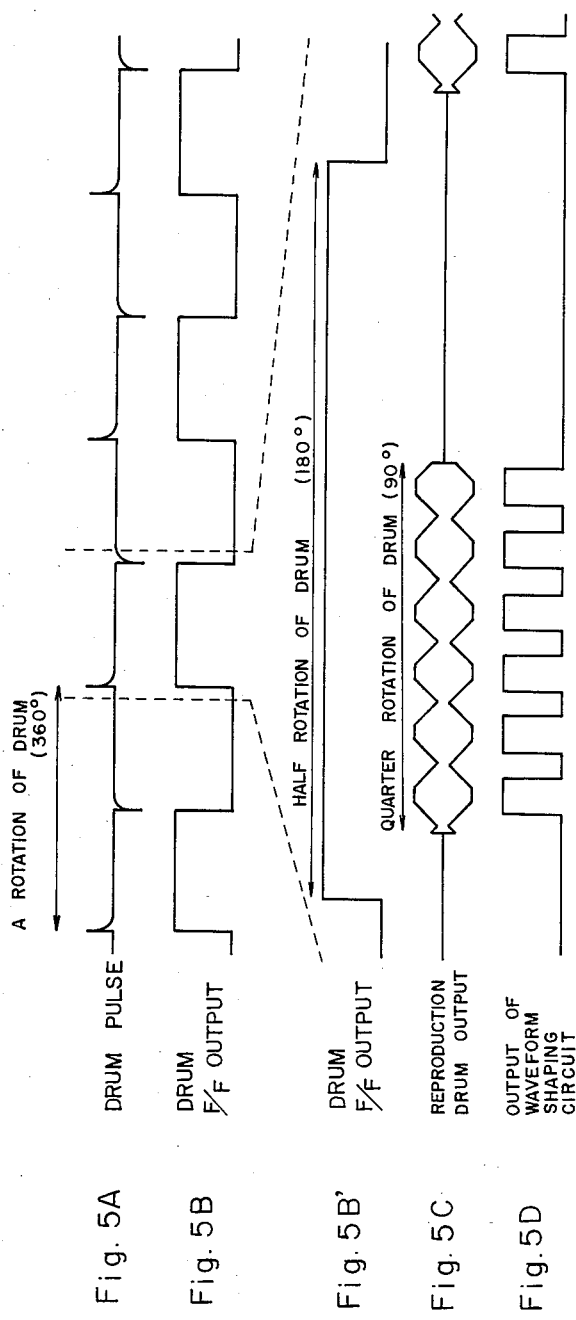
FIGS. 5A to 5D show output waveforms outputted from various sections and is used to explain the embodiment.

On the other hand, drum pulses which are synchronized with the drum rotation shown in FIG. 5A are detected from the drum PU head. One cycle of these drum pulses is equal to one rotation of the drum and also to one rotation of the drum motor 15. The drum pulses are inputted into the drum FF 17, from which pulses shown in FIG. 5 B are outputted. The output of the drum FF 17 acts on the switch 18 and when its level is high, the reproduced output of the head 2A which is at that time tracing the tape is introduced into the reproducing amplifier 19, while, when its level is low, the reproduced output of the head 2B which is, at that time tracing the tape is introduced into the reproducing amplifier. FIG. 5C shows the output of the reproducing amplifier 19 during half rotation of the drum shown in FIG. 5B', but since the tape is wound round the drum, covering angle area of about 90°, the reproducing amplifier outputs a voltage, which has a waveform such as is shown in FIG. 5C, only during quarter rotation of the drum. This output results because the head crosses the tracks. The tracks are recorded alternately by the heads 2A and 2B whose azimuth angles are different from each other. When the head 2A (or 2B) crosses the tracks, therefore, the tracks coincide with the head 2A (or 2B) in azimuth angle every other track. Top portions of the output waveform of the reproducing amplifier shown in FIG. 5C are outputs caused by the tracks which coincide with the head in azimuth angle and valley portions thereof outputs caused by the other tracks which do not coincide with the head in azimuth angle. Therefore, the number of top portions is half the number of tracks crossed.

The output which has been amplified by the reproducing amplifier 19 and which is applied from the head 2A or 2B is inputted into the waveform shaping circuit 20. The waveform shaping circuit 20 slices the waveform of FIG. 5C at an appropriate level and shapes it to a rectangular wave to output pulses shown in FIG. 5D. Applied to the counter circuit 21 are the output of the drum FF shown in FIG. 5B and output of the waveform shaping circuit shown in FIG. 5D. The counter circuit 21 counts output pulses outputted of the waveform shaping circuit 20, using the period of half rotation of the drum as a unit, and after it finishes its counting, it holds and outputs a voltage which is proportional to the value counted, thereby causing its counting result to be reset. The counter circuit counts output pulses of the waveform shaping circuit 20 again during the next period of half rotation of the drum and holds another voltage which is proportional to its value counted. However, the output voltage which has been held during the previous period is released just before another voltage is held. As described above, the output voltage of the counter circuit 21 is the one which is proportional to the number of peaks of the head-reproduced output caused during quarter rotation of the drum and when the number of peaks increases, that is, the tape runs at high speed (in forward or reverse direction), the output voltage of the counter circuit 21 rises.

Outputs of the counter and second operation circuits 21 and 22, and tape running direction setting signal are inputted into the tape running control circuit 23. The output of the second operation circuit 22 is obtained by calculating from the equation (2) the number Mn of tracks which the head crosses during its one trace of the tape when the relative velocity is kept constant, the output of the counter circuit 21 is half the number of tracks which the head actually crosses and the tape running direction setting signal represents the direction in which the tape is to be run. The tape running control circuit 23 makes the output of the second operation circuit 22 half and uses it as a reference voltage for the tape running speed. In a case where the tape runs in reverse direction, the result obtained by the equation (2) becomes negative. Therefore, the output polarity is reversed by the tape running direction setting signal and used as the reference voltage. The output of the counter circuit 21 is compared with the reference voltage and their differential voltage is outputted from the tape running control circuit 23. This output controls the reel motor 25 through the reel motor driving circuit 24. The tape is thus run at constant speed. The tape running direction setting signal is applied to the reel motor driving circuit 24 to control the rotating direction of the reel motor 25 or tape running direction.

In the case where the tape is run at a speed (n) times the reference speed, as described above, the number Nn of drum motor rotation with which the relative velocity becomes constant, similarly in the case where the tape is run at the reference speed, under the tape speed and direction set is calculated from the equation (1) to control the drum motor to have this rotation number, the number N'n of drum motor rotation actually detected is put into the equation (2) to calculate Mn (or the number of tracks which the head crosses during its one trace on the tape) which is obtained when the tape runs at a speed under which the relative velocity is to become constant, while rotating the drum motor at the number N'n, and this calculated Mn is compared with the number of tracks which the head crosses and which is detected when the tape is actually running, to make the tape running speed constant in line with this comparison result, thereby enabling the relative velocity to be made constant. The equations (1) and (2) on which the above is based will be described below. The following symbols will be used in the course of this description.

D: diameter of the drum,
$\phi$: angle at which the tape is wound,
$\theta n$: angle at which the head traces the tape,
Vn: tape running speed,
Nn: number of drum rotations,
vn: relative velocity, and
W: effective width of the tape.

The affixed (n) is a multiple relative to figures of the components when the tape is at the reference speed. Namely, n=1 is at the time when the tape is running at the reference speed and n=0 at the time when the tape is stopped. It is also assumed that the polarity of (n) is positive when the tape is running in forward direction but negative when the tape is running in reverse direction.

Figure 6:
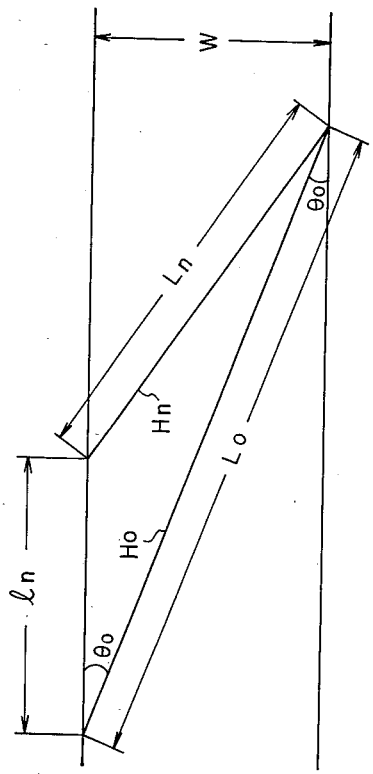
FIG. 6 is a view explaining the principle of the present invention.

FIG. 6 shows the tape. Ho and Hn represent those loci along which the head traces the tape, wherein Ho denotes the locus when the tape is stopped and Hn the locus when the tape is running at a speed (n) times the reference speed. The length Lo of Ho is:

$$Lo = \frac{\phi}{2\pi} \pi D = \frac{\phi D}{2} \quad (3)$$

The length ln which the tape runs during $\phi/2\pi$ rotation of the drum when the tape is running at the speed (n) times the reference speed is:

$$ln = \phi/2\pi \cdot Vn/Nn \quad (4)$$

and the length Ln of Hn is:

$$Ln = \sqrt{(Lo \cos \theta_o - ln)^2 + W^2} \quad (5)$$

The head traces the length Ln in the equation (5) under the rotation number Nn, but the time during which the head traces the length Ln is $\phi/2\pi Nn$. Therefore, the relative velocity vn is:

$$vn = Ln \frac{2\pi Nn}{\phi} \quad (6)$$

and as apparent from FIG. 6, $$W = Lo \sin \theta o \quad (7)$$

When the number Nn of drum rotation is obtained from the equations (3) through (7), $$Nn = \frac{Vn \cos \theta o + \sqrt{vn^2 - (Vn \sin \theta o)^2}}{\pi D} \quad (8)$$

It is assumed here that the relative velocity vn is same as the one v1 at the time of the reference speed or vn=v1, $$Nn = \frac{Vn \cos \theta o + \sqrt{v1^2 - (Vn \sin \theta o)^2}}{\pi D} \quad (9)$$

Vn is equal to (n) times the relative velocity at the time of the reference speed, the relative velocity v1 is larger than the tape running speed, and $\theta o$ is usually equal to about 6°. Therefore, the equation (9) can approximate to $$Nn \approx \frac{V1 \cos \theta o}{\pi D} n + \frac{v1}{\pi D} \quad (10)$$

On the other hand, when (k) units of heads are arranged on the drum with an equal interval interposed between them, one track per V1/kN1 is recorded in the longitudinal direction of the tape. Therefore, the number Mn of tracks which the heads cross during the time when the drum which is rotating at Nn when the tape is running at high speed rotates by $\phi/2\pi$ is:

$$Mn = (ln - l1) \frac{kN1}{V1} = \frac{k\phi(nN1 - Nn)}{2\pi Nn} \quad (11)$$

Therefore when (n) which is obtained from the equation (10) is put into the equation (11), $$Mn = -\frac{k\phi N1 \, v1}{2\pi V1 \cos \theta o} \cdot \frac{1}{Nn} + \frac{k\phi(\pi D N1 - V1 \cos \theta o)}{2\pi V1 \cos \theta o} \quad (12)$$

Since factors except (n) and Nn are constants in the equations (10) and (12), the equations (10) and (12) become the same as the above-mentioned equations (1) and (2) as follows:

$$Nn = A \cdot n + B \quad (13)$$

$$Mn = -C (1/Nn) + D \quad (14)$$

As described above, the equation (13) represents the number Nn of drum motor rotations necessary to make the relative velocity constant or v1 when the tape is run at high speed or the speed (n) times the reference speed in forward or reverse direction, and the equation (14) the number of tracks which the head crosses when the tape is running while leaving the drum rotating at the rotation number Nn. When the drum motor and tape running speed are controlled to meet the equations (13)

and (14), therefore, the tape can run at a constant high speed and the relative velocity (n) can be made constant in relation to various values.

Because the tape running speed is detected using digital values which represent the number of tracks which the head crosses, an error exists when the tape running speed is compared with the result calculated from the equation (14). However, program retrieving is usually carried out at high speed and the number of tracks which the head crosses is large, thereby enabling the error to practically be neglected.

Although the relative velocity has been arranged to become v1 at the time of the reference speed in the case of this embodiment, it may be determined optionally.

Although the tape running speed and direction setting signals have been added to the input terminals 10 and 11 respectively, and then inputted into the first operation circuit 12 in the case of the embodiment shown in FIG. 1, the tape running speed setting signal may be applied only to the input terminal 10 after the polarity of the tape running direction is added to the tape running speed setting signal. In this case, if the tape running direction setting signal is separated and extracted through the input terminal 10 and added to the tape running control and reel motor driving circuits 23 and 24, the input terminal 11 can be omitted.

Although the second operation circuit 22 has outputted positive or negative voltage according to the equation (2), the tape running direction setting signal which is added to the tape running control circuit 23 can be omitted if the absolute value of the voltage is outputted from the second operation circuit 22.

According to the above-described embodiment, the operational result based on the tape running speed and direction signals is used as reference voltage to control the drum motor, the operational result based on the detected voltage which corresponds to the number of drum motor rotation is used as reference voltage to control the reel motor, and the tape running speed is detected, using the number of tracks which the head crosses, in the case where the tape is run at high speed at the reproducing time. Therefore, the relative velocity can be made constant in a simple manner and the tape can be run at a constant high speed without using any particular speed detector means.

For the purpose of detecting the tape running speed, the number of tracks which the head crosses is detected as the tape running speed in the case of this embodiment. However, in the case of the magnetic recording and reproducing apparatus of the rotating head type or home VTR, for example, wherein a tape which has a control track for tracking is used, control signals are recorded on the tape, so that the tape running speed can be detected, using these control signals.

Figure 7:
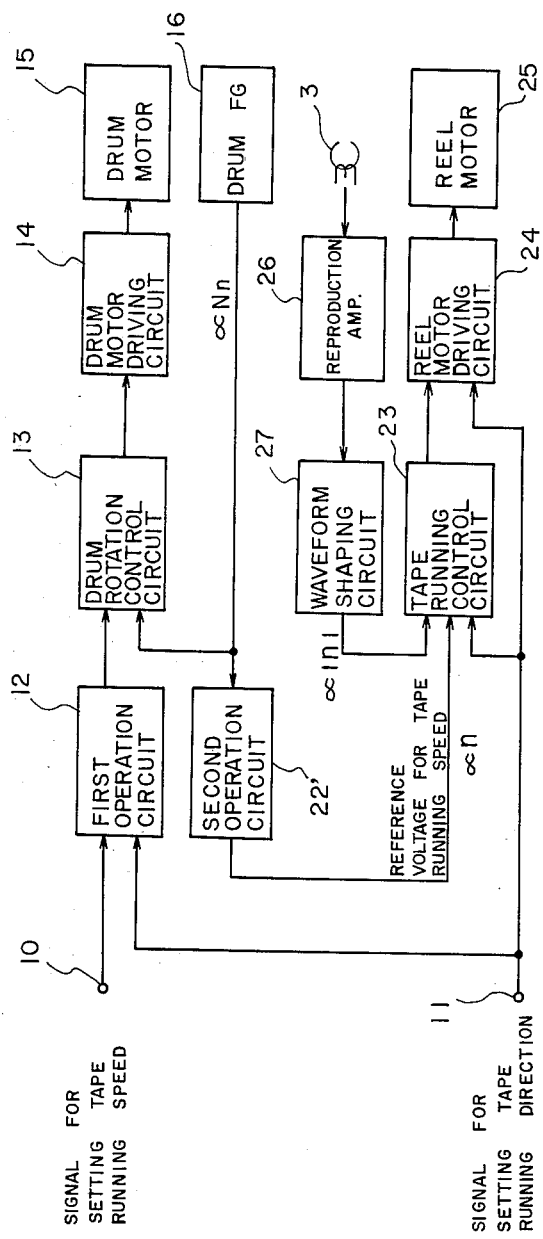
FIG. 7 is a block diagram showing another embodiment of the present invention.

FIG. 7 is a block diagram showing another example of the relative velocity control device according to the present invention. In FIG. 7, reference numeral 10 represents an input terminal to which the tape running speed setting signal is applied, 11 an input terminal to which the tape running direction setting signal is applied, 12 a first operation circuit for carrying out a predetermined operation based on the tape running speed and direction setting signals to determine the rotation number of the rotating drum 1 and generating a reference voltage which corresponds to the rotation number, 13 a drum rotation control circuit, 14 a drum motor driving circuit, 15 a drum motor, 16 a drum FG (or drum frequency generator), 26 a reproducing amplifier for amplifying the reproduced voltage of a control head 3, 27 a circuit for waveform-shaping the output of the reproducing amplifier 26, 22' a second operation circuit for carrying out a predetermined operation based on the output of the drum FG 16 or actual rotation number of the drum motor to determine the tape running speed and generating a reference voltage for the tape running speed, 23 a tape running control circuit, 24 a reel motor driving circuit, and 25 a reel motor.

Figure 8:
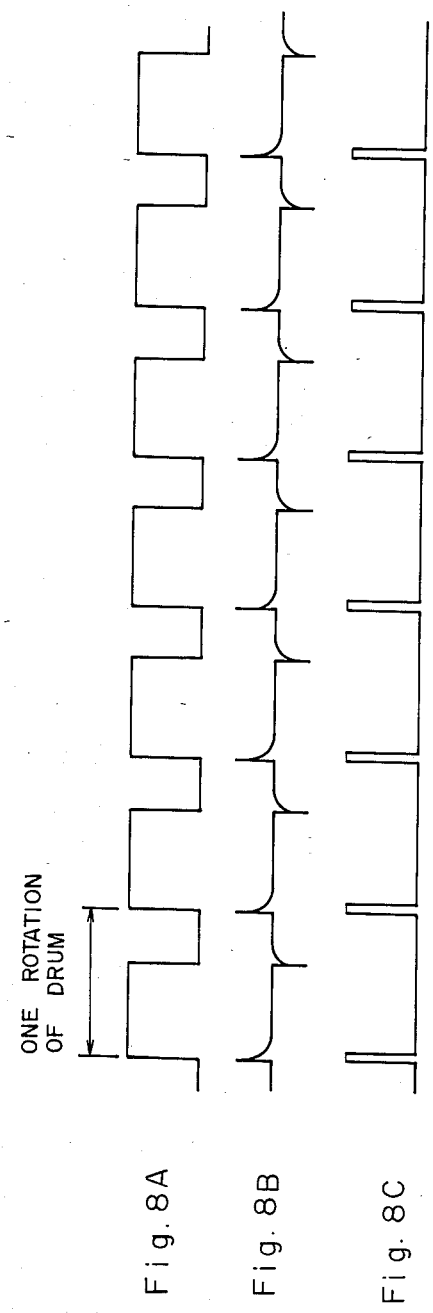
FIGS. 8A to 8C are intended to explain the embodiment shown in FIG. 7.

Similarly, as in the case of the first embodiment, the drum motor 15 is stably rotated at the rotation number N'n through the first operation, drum rotation control and drum motor driving circuits 12, 13 and 14. The output of the drum FG 16 or actual rotation number N'n of the drum motor 15 is inputted into the second operation circuit 22' and the tape running speed (n) is calculated from the following equation:

$$n = (N'n - B)/A \qquad (15)$$

wherein A and B are constants. The equation (15) is a variation of the equation (1). When the tape running speed (n) is related to the number N'n of drum rotation by the equation (15), the relative velocity between the head and the tape is equal to that at the time when the tape is running at the reference speed, provided that Nn=N'n, as described above. In response to the actual rotation number of the drum motor 15, the second operation circuit 22' calculates the equation (15) to obtain the tape running speed and generates a reference voltage which is proportional to this tape running speed. The polarity of this voltage is positive when the tape running direction is forward or when the rotation of the drum motor 15 is faster than at the recording time, but negative when the direction is reverse or rotation of the drum motor 15 is slower. On the other hand, the reproduced voltage of the control head 3 is applied to the reproducing amplifier 26 and amplified there. A signal shown in FIG. 8A and synchronized with drum rotation, as described above, is recorded on the control track. Therefore, a signal which has a waveform shown in FIG. 8C is outputted through the reproducing amplifier 26. The output of the reproducing amplifier 26 is inputted into the waveform shaping circuit 27. The waveform shaping circuit 27 shapes the input signal to a rectangular wave by slicing it at the appropriate level, extracts pulses of positive or negative polarity, and outputs pulses shown in FIG. 8C. The output of the reproducing amplifier 26 shown in FIG. 8B is at the time when the tape running direction is forward, and in the case where it is reverse, a waveform whose polarity is reversed as compared with the waveform shown in FIG. 8B is outputted through the reproducing amplifier 26. As shown in FIG. 8A, however, the duty ratio of the waveform recorded on the control track is constant. Therefore, the frequency of pulses outputted from the waveform shaping circuit 27 is the same in both cases where the tape running direction is forward and reverse. Since the output frequency of the waveform shaping circuit 27 is proportional to the absolute value of the actual tape running speed (n), it becomes high when the tape runs at high speed. The outputs of the second operation and waveform shaping circuits 22' and 27, and tape running direction setting signal are inputted into the tape running control circuit 23. The output of the second operation circuit 22' represents the tape running speed which makes the relative velocity constant under the drum rotation number N'n, the output of the waveform shaping circuit 27 the actual tape running speed, and the tape running direction setting signal the direction in which the tape is to be run. The tape running control circuit 23 makes the output of the second operation circuit 22' a reference voltage for the tape running speed. In the case where the tape running direction is in reverse, the result obtained from the equation (15) becomes negative. Therefore, the output polarity is reversed by the tape running direction setting signal and used as the reference voltage. After the output of the waveform shaping circuit 27 is subjected to frequency/voltage conversion, it is compared with the reference voltage, their differential voltage is outputted from the tape running control circuit 23, and this output controls the reel motor through the reel motor driving circuit 24. The tape is thus run at constant speed. The tape running direction setting signal is applied to the reel motor driving circuit 24 to control the rotating direction of the reel motor 25 or tape running direction.

In the case where the tape is run at a speed (n) times the reference speed as described above, the number Nn of drum motor rotation which makes the relative velocity constant in relation to the tape running speed and direction set, similarly in the case where the tape is running at the reference speed, is calculated from the equation (1) to control the drum motor to rotate under this rotation number; the equation (15) is solved, using the number N'n of drum motor rotation actually detected, to calculate the tape running speed (n) at which the relative velocity is to become constant when the number of drum motor rotation is N'n; and the tape running is controlled to make the actual tape running speed, which has been detected as the frequency of the control signal, accorded with this calculated (n), whereby the tape running speed is kept constant to make the relative velocity constant.

Although the tape running speed and direction setting signals have been applied to the input terminals 10 and 11, respectively, and then inputted into the first operation circuit 12 in the case of the second embodiment shown in FIG. 7, the tape running speed setting signal to which the polarity of the tape running direction has been added may be applied only to the input terminal 10. When the tape running direction setting signal is separated and extracted from the input terminal 10 and added to the tape running control and reel motor driving circuits 23 and 24 in this case, the input terminal 11 can be omitted.

Although the second operation circuit 22' has outputted a voltage, either positive or negative according to the equation (15), the tape running direction setting signal which is added to the tape running control circuit 23 can be omitted when the absolute value of this voltage is outputted through the second operation circuit 22'.

Figure 9:
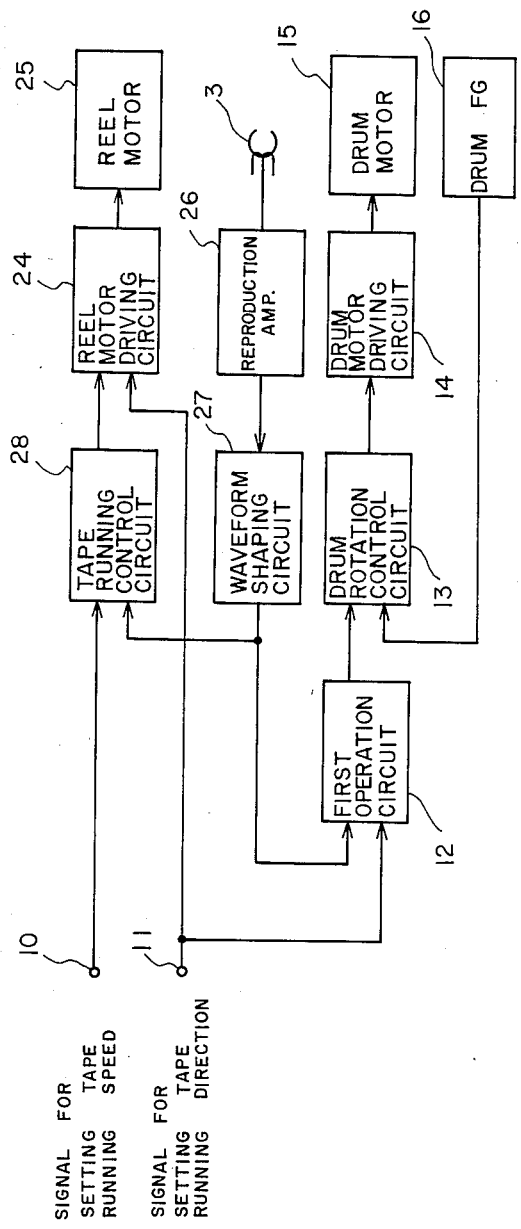
FIG. 9 is a block diagram showing a further embodiment of the present invention.

According to the second embodiment shown in FIG. 7, the number of drum rotation has been controlled at first, in such a way that the relative velocity becomes constant in relation to the tape running speed and direction set, similarly in the case where the tape is run at the reference speed, and the tape running speed has then been controlled by detecting the actual number of drum rotation to make the relative velocity constant in the case where the tape is run at a speed (n) times the reference speed. However, it can also be arranged so that the tape running speed is controlled at first, in relation to the tape running speed and direction set, and that the number of drum rotations is then controlled by detecting the actual tape running speed to make the relative velocity constant. FIG. 9 is a block diagram showing a further example of the control device according to the present invention which can meet the above condition. The same parts as those in FIG. 7 will be represented by the same reference numerals as in FIG. 9. When the tape running speed and direction are set optionally and their setting signals are applied to the input terminals 10 and 11 respectively, in the case of this embodiment shown in FIG. 9, the tape is run responsive to the tape running speed and direction setting signals set. On the other hand, the actual tape running speed is detected and using this detected voltage as reference voltage, the drum is rotated in such a way that the relative velocity becomes constant. Detailed description will be made below, referring to FIG. 9. Tape running speed and direction setting signals are applied to the input terminals 10 and 11, respectively, quite similar to the case shown in FIG. 7. The tape running speed setting signal is inputted into a tape running control circuit 28. On the other hand, the reproduced voltage of the control head 3 is applied to the waveform shaping circuit 27 through the reproducing amplifier 26 and the pulses shown in FIG. 8C are outputted through the waveform shaping circuit 27, quite similar to the case shown in FIG. 7. The output of the waveform shaping circuit 27 is also applied to the tape running control circuit 28, which uses, as reference voltage, a voltage proportional to the tape running speed setting signal and which compares a voltage obtained by converting the frequency to the voltage of the output of the waveform shaping circuit 27 with the reference voltage, thereby to output their differential voltage. This output controls the reel motor 25 through the reel motor driving circuit 24, thereby causing the tape to be run at constant speed. The tape running direction setting signal is applied to the reel motor driving circuit 24 to control the direction of rotation of the reel motor 25 or tape running direction. The output of the waveform shaping circuit 27 is also applied to the first operation circuit 12. The tape running direction setting signal is also applied to the first operation circuit 12. The output frequency of the waveform shaping circuit 27 is proportional to the absolute value of actual tape running speed (n'), and using the output of the waveform shaping circuit 27 and tape running setting signal, the first operation circuit 27 calculates the rotation number of the drum motor 15 from the following equation and outputs, as reference voltage, a voltage proportional to this rotation number, quite similar to the case of the embodiment shown in FIG. 7:

$$Nn = A n' + B \tag{16}$$

Thereafter, the rotation of the drum motor is controlled quite similar to the case of the embodiment shown in FIG. 7.

In the case where the tape is run at a speed (n) times the reference speed, as described above, the tape is controlled according to tape running speed and direction set, the rotation number Nn of the drum motor at which the relative velocity becomes constant, similarly at the time of the reference tape speed, when the tape running speed actually detected is (n'), is calculated from the equation (16), and the drum motor is controlled to rotate at this rotation number, whereby the tape running speed is kept constant to make the relative velocity constant.

According to the embodiments shown in FIGS. 7 and 9, the operational result based on tape running speed and direction setting signal may be used as as reference voltage to contol the drum motor, and detected voltage which corresponds to the rotation number of the drum motor is used as reference voltage to control the reel motor, in the case where the tape is run at high speed at the reproducing time. A voltage proportional to the tape running speed setting signal is used as reference voltage to control the reel motor and the operational result based on a signal which corresponds to the tape running speed and also based on the tape running direction setting signal is used as reference voltage to control the drum motor. The tape running speed is detected as the frequency of control signal in both cases. Therefore, the relative velocity can be made constant and the tape can be run at a constant high speed in a simple manner. In addition, the drum rotation changes associating with the tape running speed. The relative velocity can thus be kept constant even under such transit condition that the drum rotation or tape running speed changes corresponding to a set value.

Although the relative velocity has been arranged to become v1, which is at the time of reference tape speed, in the cases of the embodiments shown in FIGS. 1, 7 and 9, it may be determined optionally.

I claim:

1. A relative velocity control device for use with the magnetic recording and reproducing apparatus comprising a means for inputting tape running speed and direction setting signals, a first means for carrying out an operation $Nn = A \cdot n + B$ (wherein A and B are constants) on the basis of a signal $\pm n$ obtained from said input means and generating a reference voltage proportional to a number Nn of drum motor rotation obtained from this operation, a means for driving a drum motor, using the output of said first reference voltage generating means as reference voltage, a means for detecting an actual number N'n of drum motor rotation, a second means for carrying out an operation $Mn = -C/N'n + D$ (wherein C and D are constants) on the basis of the number N'n of drum motor rotation obtained by said detector means and generating a reference voltage proportional to a number Mn of tracks which a head crosses and which is obtained from the operation, a means for counting the number of tracks which the head actually crosses and generating a voltage proportional to this counted value, a means for comparing the output voltage of this generator means with the absolute value of the output voltage of said second reference voltage generator means, and a means for driving a reel motor responsive to the output of this comparator means and tape running direction setting signal, wherein the tape is run at a constant speed to usually obtain a constant relative velocity.

2. A relative velocity control device for use with the magnetic recording and reproducing apparatus according to claim 1 wherein in the case where the output of said second reference voltage generator means is a voltage proportional to the absolute value of a result obtained by operating the equation $Mn = -C/N'n + D$, said comparator means serves to compare this voltage with a voltage proportional to the counted number of tracks which the head actually crosses.

3. A relative velocity control device for use with the magnetic recording and reproducing apparatus of the rotating head type, in which a tape having a control track is used, comprising a means for inputting tape running speed and direction setting signals, a first means for carrying out an operation $Nn = A \cdot n + B$ (wherein A and B are constants) on the basis of a signal $\pm n$ obtained by said input means and generating a reference voltage proportional to a number Nn of drum motor rotation obtained from this operation, a means for driving a drum motor, using the output of said first reference voltage generator means as reference voltage, a means for detecting an actual rotation number N'n of said drum motor, a second means for carrying out an operation $n = (N'n - B)/A$ on the basis of the rotation number N'n of said drum motor obtained by said detector means and generating a reference voltage proportional to a tape running speed (n) obtained from this operation, a means for generating a voltage proportional to the frequency of a control signal recorded on the control track, a means for comparing the output voltage of this generator means with the absolute value of the output voltage of said second reference voltage generator means, and a means for driving a reel motor responsive to the output of the comparator means and tape running direction setting signal, wherein the tape is run at a constant speed to usually obtain a constant relative velocity.

4. A relative velocity control device according to claim 3 wherein, in the case where the output of said second reference voltage generator means is a voltage proportional to the absolute value of a result obtained by operating the equation $n = (N'n - B)/A$, said comparator means serves to compare this voltage with a voltage proportional to the frequency of the control signal.

5. A relative velocity control device according to claim 3 wherein said first reference voltage generator means carries out an operation $Nn = A \cdot n' + B$ on the basis of the output voltage of a means which generates voltages proportional to the frequencies of the control signal and the tape running direction setting signal and generates a voltage proportional to the number of Nn of drum motor rotation obtained from the operation, said second reference voltage generator means generates a voltage proportional to the tape running speed setting signal, and said comparator means compares the output voltage of said means which generates a voltage proportional to the frequency of the control signal, with the output voltage of said second reference voltage generator means.

6. A relative velocity control device for use with the magnetic recording and reproducing apparatus comprising a means for inputting tape running conditions, a first operational means for calculating a number of drum motor rotations on the basis of a conditional equation which makes the relative velocity between a head and a tape constant, responsive to a signal obtained from said input means, a first means for detecting a rotation number of a drum motor which is actually being driven, a means for controlling the rotation of a drum on the basis of those results which are obtained from the first operational and detector means, to thereby drive the drum motor, a second operational means for obtaining a tape running speed which satisfies the conditional equation, using the rotation number of said now rotating drum motor obtained by said first detector means, a second means for detecting the running state of said now driven tape, and a means for controlling speed and direction of said tape according to those results which are obtained from said input means, second operational and detector means to thereby drive said tape, wherein the relative velocity can be controlled constant.

7. A relative velocity control device for use with the magnetic recording and reproducing apparatus comprising a means for inputting tape running conditions to drive a tape, a means for detecting the running conditions of said tape which is actually being driven, an operational means for obtaining a rotation number of a drum motor using the tape driver and detector means, and said rotation number satisfying a conditional equation which makes the relative velocity between a head and a tape constant, a means for detecting a rotation number of a drum which is actually being driven, and a means for controlling the rotation number of said drum to drive the drum motor, wherein the relative velocity can be controlled constant.

* * * * *